(12) United States Patent
Miller et al.

(10) Patent No.: US 9,547,607 B2
(45) Date of Patent: Jan. 17, 2017

(54) BROKERING APPLICATION ACCESS FOR PERIPHERAL DEVICES

(71) Applicant: Microsoft Corporation, Redmond, WA (US)

(72) Inventors: Dylan David Miller, Seattle, WA (US); George Evangelos Roussos, Seattle, WA (US); Paul Sliwowicz, Seattle, WA (US); Peter William Wieland, Seattle, WA (US); Benjamin Scott McGregor, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/929,242

(22) Filed: Jun. 27, 2013

(65) Prior Publication Data

US 2015/0006761 A1 Jan. 1, 2015

(51) Int. Cl.
*G06F 3/00* (2006.01)
*G06F 13/12* (2006.01)
*G06F 21/52* (2013.01)

(52) U.S. Cl.
CPC ............. *G06F 13/122* (2013.01); *G06F 21/52* (2013.01)

(58) Field of Classification Search
None
See application file for complete search history.

(56) References Cited

U.S. PATENT DOCUMENTS

| 5,202,997 | A | | 4/1993 | Arato | |
|---|---|---|---|---|---|
| 5,680,620 | A | * | 10/1997 | Ross | G06F 9/4812 710/15 |
| 6,895,453 | B2 | * | 5/2005 | Allen et al. | 710/33 |
| 7,188,252 | B1 | * | 3/2007 | Dunn | H04L 63/0815 713/164 |
| 7,350,204 | B2 | * | 3/2008 | Lambert et al. | 717/172 |
| 8,214,558 | B1 | * | 7/2012 | Sokolov | 710/39 |

(Continued)

OTHER PUBLICATIONS

"Android Security Overview", Published on: Oct. 12, 2011, Available at: http://source.android.com/tech/security/index.html#top.

(Continued)

*Primary Examiner* — Elias Mamo
(74) *Attorney, Agent, or Firm* — Sunah Lee; Dan Choi; Micky Minhas

(57) ABSTRACT

Systems, methods, and computer-readable storage media are provided for brokering access to peripheral devices and/or device models associated with a computing system. An access broker evaluates requests for access to peripheral devices/models on behalf of a plurality of applications. The access broker evaluates requests for access to peripheral devices including scanners, point-of-sale devices, and devices using ubiquitous device protocols (e.g., USB, HID, Bluetooth, and Bluetooth LE) utilizing application declarations and user consents based upon device model identifiers and/or device-specific identifiers associated with the various devices. Applications may be notified of consent changes at runtime and/or application firmware updates for peripheral devices may be conducted upon receipt of user consent, for instance, to ensure adequate battery power before performing a peripheral device firmware update.

20 Claims, 8 Drawing Sheets

(56) References Cited

U.S. PATENT DOCUMENTS

| | | |
|---|---|---|
| 8,332,936 B1 | 12/2012 | Hackborn et al. |
| 2012/0151606 A1 | 6/2012 | Hannon |
| 2012/0209923 A1* | 8/2012 | Mathur .................. G06F 21/53 709/206 |
| 2012/0284702 A1 | 11/2012 | Ganapathy et al. |
| 2012/0304283 A1 | 11/2012 | Beam et al. |
| 2013/0067531 A1 | 3/2013 | Morris |
| 2013/0067600 A1 | 3/2013 | Graham et al. |
| 2013/0311684 A1* | 11/2013 | Dabbiere ........................ 710/36 |
| 2014/0068248 A1* | 3/2014 | Kobres .................. G06F 21/82 713/155 |

OTHER PUBLICATIONS

AMRAV, "Understanding Android Security Permissions", Published on: Jan. 12, 2012, Available at: http://www.androidguru.com/understanding-android-security-permissions.

Roesner, et al., "User-Driven Access Control: Rethinking Permission Granting in Modern Operating Systems", in Proceedings of IEEE Symposium on Security and Privacy, May 20, 2012, 15 pages.

"Guidelines for Devices that Access Personal Data (Windows Store Apps)", Published on: Oct. 23, 2012, Available at: http://msdn.microsoft.com/en-us/library/windows/apps/Hh768223.aspx.

"International Search Report & Written Opinion for PCT Application No. PCT/US2013/061043", Mailed Date: Mar. 24, 2014, Filed Date: Sep. 20, 2013, 8 Pages.

\* cited by examiner

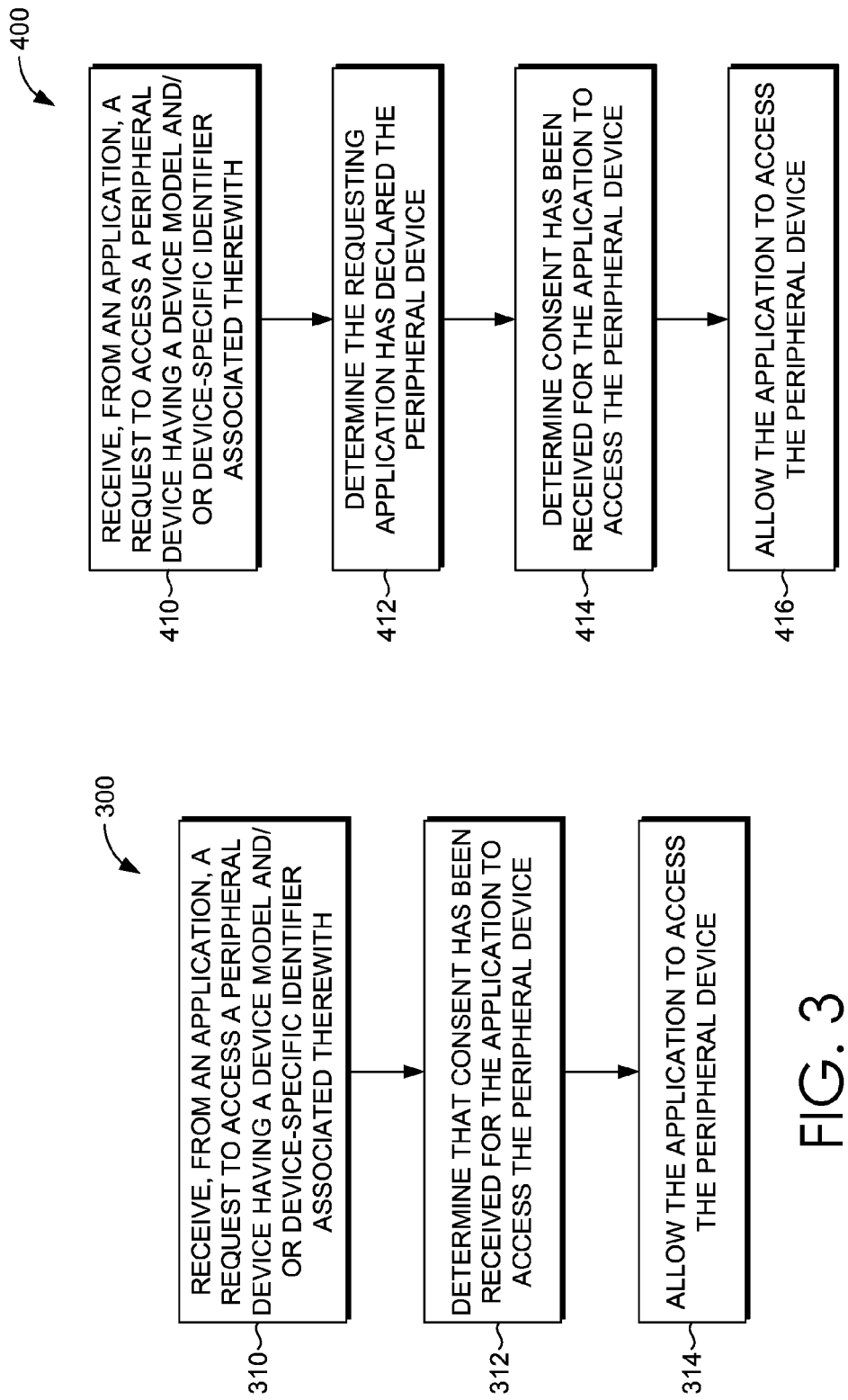

BROKERING APPLICATION ACCESS FOR PERIPHERAL DEVICES

BACKGROUND

Computing systems typically allow various applications to access hardware devices installed on or otherwise associated with the computing system. Such devices include, by way of example only, storage devices, cameras, microphones, printers, location service devices, video capture devices, and the like. While having such hardware devices available allows applications to provide functionality that is desired by users, controlling access to such devices by different applications can be problematic. For instance, it is possible for an application to access potentially risky capabilities without the user's consent or knowledge. For example, there are existing exploits that target location services, messaging services, and the like that can compromise a user's privacy or cause the user to be charged by their network provider without the user's knowledge or consent. While users may be prompted for their approval in order for an application to access a particular device or device capability, such prompting can be difficult to explain to users. For example, when prompting a user for approval, it can be difficult to explain to the user exactly what access to a particular device or device capability is requested by an application and what the implications of allowing the access are. This can result in a confusing user experience.

Further, where supported, users may add new hardware devices to their existing computer configuration, for instance, peripheral hardware devices. The addition of these new devices complicates traditional approaches for allowing applications to access hardware devices and/or device capabilities because it is oftentimes assumed that the list of known possible hardware devices and their capabilities is always available. Further, existing approaches to adding peripheral hardware devices using ubiquitous protocols (e.g., USB, HID, Bluetooth, Bluetooth LE, etc.) generally require custom drivers making them prohibitively costly to support.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for brokering access to peripheral devices and device models associated with a computing system. An access broker evaluates requests for access to peripheral devices or device models on behalf of a plurality of applications. Generally, such requests indicate an application desires to access a particular capability associated with an identified peripheral device or model. The access broker enforces certain behaviors and policies (e.g., a policy may require the application have an application manifest that declares the peripheral device and/or device model, or a policy may require a user to consent to the application's use of the device and/or device model) before granting an application access to a device/model at runtime. The access broker evaluates requests for access to peripheral devices and/or device models including scanners, point-of-sale devices, and devices using ubiquitous device protocols (e.g., Universal Serial Bus (USB), Human Interface Device (HID), Bluetooth, and Bluetooth Low Energy (LE)) utilizing application declarations and user consents based upon at least one of device model identifiers (e.g., an identifier associated with the device model) and device-specific identifiers (e.g., a unique identifier provided by the hardware device vendor or a device-specific identifier generated by the system) associated with the various devices/models.

Utilizing embodiments of the present invention applications may be notified of a revocation or other change in consent at runtime providing the application the opportunity to update features thereof (e.g., user interface (UI) features) accordingly. Further, application firmware updates for peripheral devices may be conducted upon receipt of user consent, for instance, to ensure adequate battery power before performing a peripheral device firmware update.

BRIEF DESCRIPTION OF THE DRAWINGS

The present invention is illustrated by way of example and not limitation in the accompanying figures in which like reference numerals indicate similar elements and in which:

FIG. 3 is a flow diagram showing an exemplary method for brokering application access to peripheral devices, in accordance with an embodiment of the present invention;

FIG. 4 is a flow diagram showing another exemplary method for brokering application access to peripheral devices, in accordance with an embodiment of the present invention.

DETAILED DESCRIPTION

Figure 1:
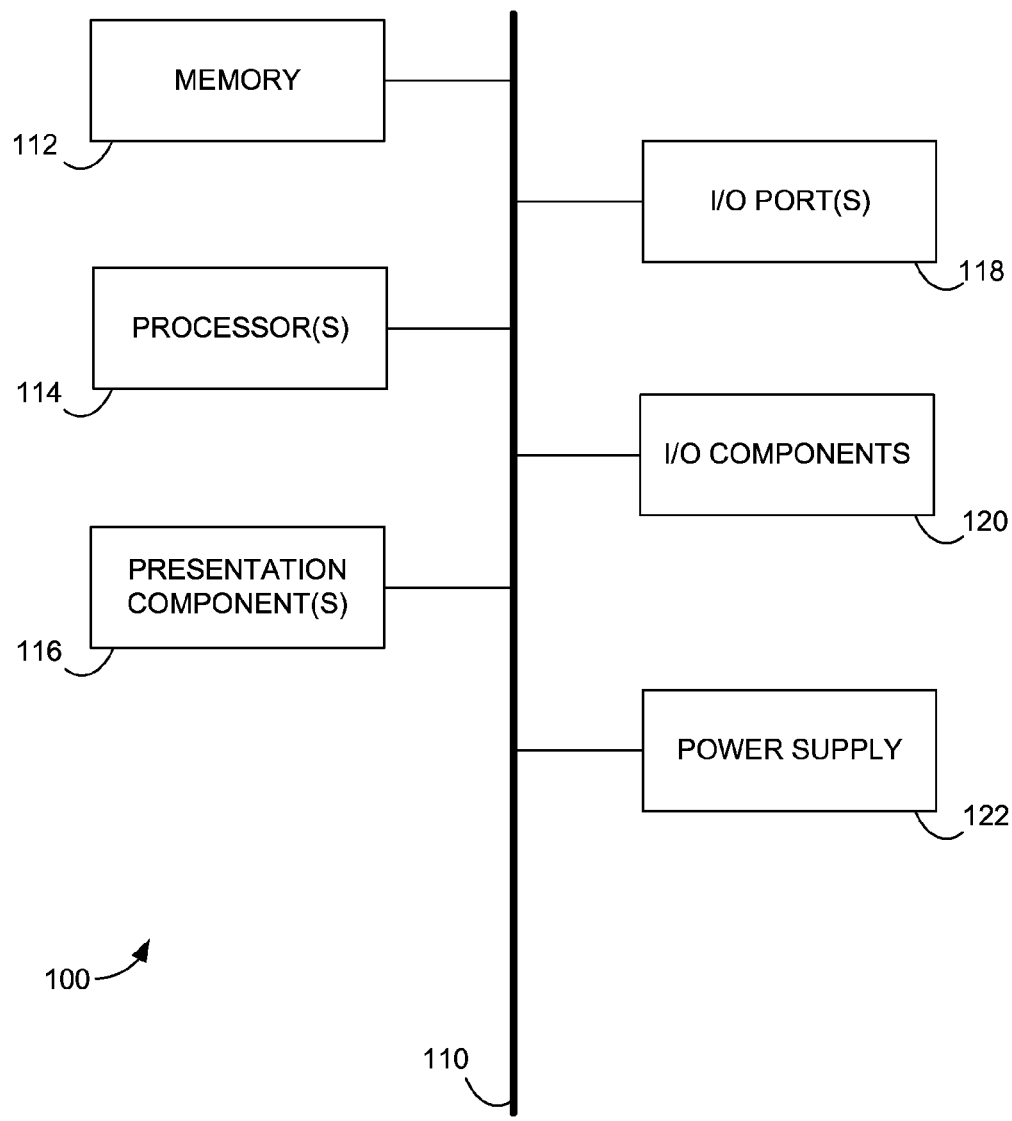
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for brokering application access to peripheral devices and device models associated with a computing system. An access broker evaluates requests for access to peripheral devices and/or device models on behalf of a plurality of applications. Generally, such requests indicate an application desires to access a particular capability associated with an identified peripheral device or device model. At least a portion of the peripheral devices/ models to which access is brokered are identified by at least one of a device model identifier and a device-specific identifier, for instance, a unique identifier provided by the hardware device vendor or a unique identifier generated by the system. The access broker enforces certain behaviors and policies before granting an application access to a device/ model at runtime. For instance, a policy of the access broker may require an application requesting access to a particular device or model to have an application manifest that declares the device/model. Or, a policy of the access broker may require that a user consent to a requesting application's access to a particular device or model prior to granting access to the requesting application. The access broker evaluates requests for access to peripheral devices and device models including scanners, point-of-sale devices, and devices using ubiquitous device protocols (e.g., USB, HID, Bluetooth, and Bluetooth LE) utilizing application declarations and user consents based upon at least one of the device model identifiers and the device-specific identifiers associated with the various devices/models.

Utilizing embodiments of the present invention applications may be notified of a grant, revocation or other change in consent at runtime providing the application the opportunity to update features thereof (e.g., UI features) accordingly. Further, application firmware updates for peripheral devices and models may be conducted upon receipt of user consent, for instance, to ensure adequate battery power before performing a peripheral device firmware update.

Accordingly, one embodiment of the present invention is directed to one or more computer-readable storage media storing computer-useable instructions that, when used by one or more computing devices, cause the one or more computing devices to perform a method for brokering application access to peripheral devices of a computing system. The method includes receiving, from an application, a request to access a peripheral device associated with the computing system, the peripheral device having at least one of a device model identifier and a device-specific identifier associated therewith. The method further includes determining that consent has been received for the application to access the peripheral device, the consent being based upon the device model identifier and/or the device-specific identifier associated with the peripheral device, and allowing the application to access the peripheral device.

In another embodiment, the present invention is directed to a system including an access broker executable by one or more processors and a peripheral device having at least one of a device model identifier and a device-specific identifier associated therewith. The access broker is configured to receive, from an application, a request to access the peripheral device; determine that the requesting application has declared the peripheral device based upon the device model identifier and/or the device-specific identifier associated therewith; determine that consent has been received for the application to access the peripheral device, the consent being based upon the device model identifier and/or the device-specific identifier associated with the peripheral device; and allow the application to access the peripheral device.

In yet another embodiment, the present invention is directed to a method being performed by one or more computing devices including at least one processor, the method for brokering access to peripheral devices associated with a computing system. The method includes receiving, from an application, a request to access a peripheral device associated with the computing system, the peripheral device having at least one of a device model identifier and a device-specific identifier associated therewith. The method further includes determining that the application has declared the peripheral device based upon the device model identifier and/or the device-specific identifier associated therewith; causing display of a user interface element having an option for indicating user consent for the application to access the peripheral device, the displayed user interface element including the device model identifier and/or the device-specific identifier; receiving the user consent via the displayed user interface element; and allowing the application to access the peripheral device based, at least in part, on the peripheral device declaration of the application and the received user consent.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures (i.e., motion or movements associated with a user's hand, hands, or other parts of the user's body, or instruments coupled with the user's body), voice, or other physiological inputs generated by a user. These inputs may be interpreted as device access requests, user consents, and the like. A NUI implements any combination of speech recognition, touch and stylus recognition, facial recognition, biometric recognition, gesture recognition both on screen and adjacent to the screen, air gestures, head and eye tracking, and touch recognition associated with a display on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Furthermore, although the term "access broker" is used herein, it will be recognized that this term may also encompass a server, a Web browser, sets of one or more processes distributed on one or more computers, one or more stand-alone storage devices, sets of one or more other computing or storage devices, any combination of one or more of the above, and the like.

As previously mentioned, embodiments of the present invention are generally directed to systems, methods, and computer-readable storage media for brokering application access to peripheral devices and/or device models associated with a computing system. An access broker evaluates requests for access to peripheral devices and device models on behalf of a plurality of applications. The access broker enforces certain behaviors and policies (e.g., a policy may require the application have an application manifest that declares the device/model and/or the policy may require that a user consent to the request) before granting an application access to a device or device model at runtime. The access broker evaluates requests for access to peripheral devices and device models including scanners, point-of-sale devices, and devices using ubiquitous device protocols (e.g., USB, HID, Bluetooth, and Bluetooth LE) utilizing application declarations and user consents based upon device model identifiers and/or device-specific identifiers (e.g., a unique identifier provided by the hardware device vendor or a device-specific identifier generated by the system) associated with the various devices/models.

Figure 2:
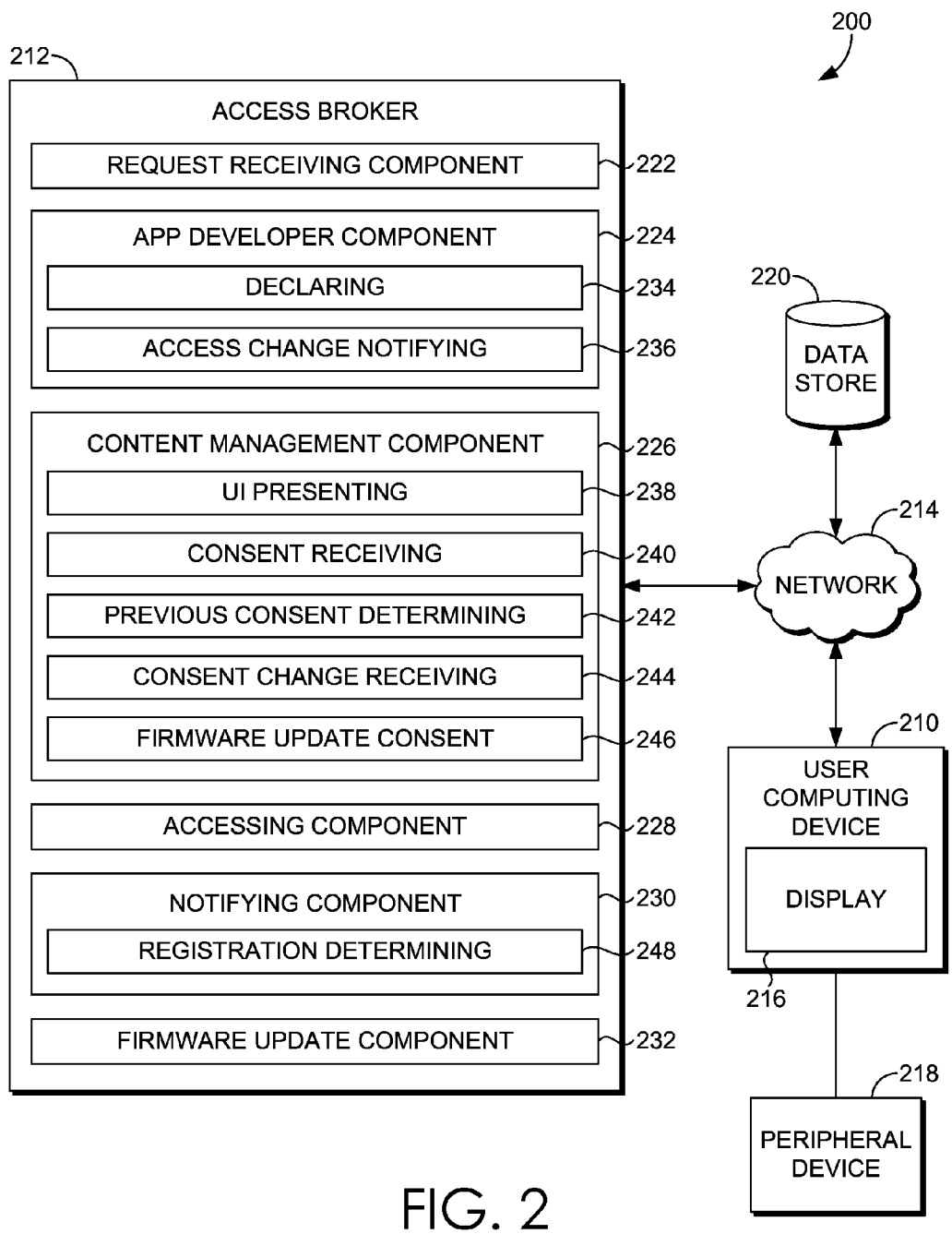
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which application access to peripheral devices associated with a computing system may be brokered, in accordance with embodiments of the present invention. Among other components not shown, the computing system 200 generally includes a user computing device 210 and an access broker 212 in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein.

It should be understood that any number of user computing devices and/or access brokers may be employed in the computing system 200 within the scope of embodiments of the present invention. Each may comprise a single device/interface or multiple devices/interfaces cooperating in a distributed environment. For instance, the access broker 212 may comprise multiple devices and/or modules arranged in a distributed environment that collectively provide the functionality of the access broker 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the access broker 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of access brokers and/or user computing devices. By way of example only, the access broker 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components/modules may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a display 216. The display 216 is configured to present, among other things, application requests for access to a peripheral device, application firmware update requests, and the like. It should be noted that embodiments of the present invention are equally applicable to mobile computing devices and devices accepting touch and/or voice input. Any and all such variations, and any combination thereof, are contemplated to be within the scope of embodiments of the present invention.

The illustrated user computing device 210 includes an external peripheral device 218 associated therewith. Generally, peripheral devices are devices that are secondary to the user computing device 210 and provide additional functionality desired by users. For instance, peripheral devices may include, by way of example only, storage devices, cameras, microphones, printers, location service devices, video capture devices, and the like. Peripheral devices are identifiable by at least one of a device model identifier (e.g., a model ID) and a device-specific identifier, for instance, a unique identifier provided by the hardware device vendor or a device-specific identifier generated by the system. In embodiments, the peripheral device 218 is one of a scanner, a point-of-sale device, or a USB, HID, Bluetooth, or Bluetooth LE device connected to the user computing device 210 using an API specific to USB, HID, Bluetooth, or Bluetooth LE, as appropriate.

The access broker 212 of FIG. 2 is configured to, among other things, broker application access to peripheral devices and device models associated with the user computing device 210. The access broker 212 further is configured to notify registered applications of appropriate changes to user access consents and to request user consent to firmware updates of peripheral devices associated with the user computing device 210. The illustrated access broker 212 has access to a data store 220. The data store 220 is configured to store information related to applications, peripherals, user-consented access permissions, and the like. In embodiments, the data store 220 is configured to be searchable for one or more of the items stored in association therewith. It will be understood and appreciated by those of ordinary skill in the art that the information stored in association with the data store 220 may be configurable and may include any information relevant to applications, peripherals, permissions, and the like. The content and volume of such information are not intended to limit the scope of embodiments of the present invention in any way. Further, though illustrated as a single, independent component, the data store 220 may, in fact, be a plurality of storage devices, for instance a database cluster, portions of which may reside in association with the access broker 212, the user computing device 210, another external computing device (not shown), and/or any combination thereof.

As previously set forth, the access broker 212 of FIG. 2 is configured to, among other things, broker application access to peripheral devices and/or device models associated with the user computing device 210. The access broker 212 further is configured to notify registered applications of appropriate changes to user access consents and to request user consent to firmware updates of peripheral devices associated with the user computing device 210. As illustrated, the access broker 212 includes a request receiving component 222, an application developer component 224, a consent management component 226, an accessing component 228, a notifying component 230, and a firmware update component 232.

The request receiving component 222 is configured to receive, from a plurality of applications, requests to access peripheral devices. As previously set forth with respect to the peripheral device 218, peripheral devices may include, by way of example only, storage devices, cameras, microphones, printers, location service devices, video capture devices, messaging devices, and the like. Peripheral devices are identifiable by at least one of a device model identifier (e.g., a model ID) and a device-specific identifier, for instance, a unique identifier provided by the hardware device vendor or a device-specific identifier generated by the system. In embodiments, peripheral devices may include scanners, point-of-sale devices, or USB, HID, Bluetooth, or Bluetooth LE devices connected to the user computing device 210 using an API specific to USB, HID, Bluetooth, or Bluetooth LE, as appropriate. In embodiments, requests received by the request receiving component 222 for access to a peripheral device include the device model identifier and/or the device-specific identifier associated therewith.

The application developer component 224 of FIG. 2 is configured to communicate with applications requesting access to peripheral devices and/or device models. The application developer component 224 includes a declaring sub-component 234. In embodiments, applications desiring access to a particular peripheral device are required to declare the particular peripheral device in the application manifest associated therewith, the declaration including the device model identifier and/or device-specific identifier associated with the desired peripheral device. Thus, the declaring sub-component 234 of the application developer component 224 is configured to prompt for and/or receive device model and/or device-specific peripheral device declarations. In embodiments, such declarations may be via a defined XML format. The declaring sub-component 234 is further configured to determine whether applications requesting access to particular peripheral devices have appropriately declared such peripheral devices based upon the device model identifiers and/or device-specific identifiers associated therewith.

In accordance with embodiments of the present invention, application developers are able to register for runtime peripheral device access consent grants, revocations or other changes allowing intelligent handling of consent changes in an application. For instance, if an application is utilizing a WebCam associated with a user computing device and consent to access the WebCam is revoked, a notification to the application may permit the application to display a message that the access has been turned off rather than presenting an error without accompanying information as to why the user interface may have changed. Alternatively, if an application is running that does not have access to the WebCam and user consent is received to allow access, automatically connecting with the WebCam (peripheral device) may be desirable. In this regard, the application developer component 224 of FIG. 2 includes an access change notifying sub-component 236 configured to permit application developers to register for receipt of runtime peripheral device access consent grants, revocations or other consent changes. Further, the notifying component 230 of the access broker 212 is configured to notify registered applications of changes in device access consent. In this regard, upon receipt of a user consent change (e.g., by the consent change receiving sub-component 244 of the consent management component 226, more fully described below), the registration determining sub-component 248 of the notifying component 230 is configured to communicate with the application developer component 224 to determine whether or not the application for which consent has been changed is registered to receive consent change notifications.

With continued reference to FIG. 2, the consent management component 226 of the access broker 212 is configured to manage user consents to requests by applications for access to peripheral devices and device models. The consent management component 226, as illustrated, includes a user interface presenting sub-component 238, a consent receiving sub-component 240, a previous consent determining sub-component 242, and a consent change receiving sub-component 244. The user interface presenting sub-component 238 is configured to present a user interface element (for instance, in association with display 216 of the user computing device 210) having an option for a user of the user computing device 210 to allow or deny access of an application to a particular peripheral device and/or device model. In embodiments, the user interface presenting sub-component 238 presents a user interface element defining, at least, the device model identifier and/or the device-specific identifier for the device the application desires to access.

Figure 6:
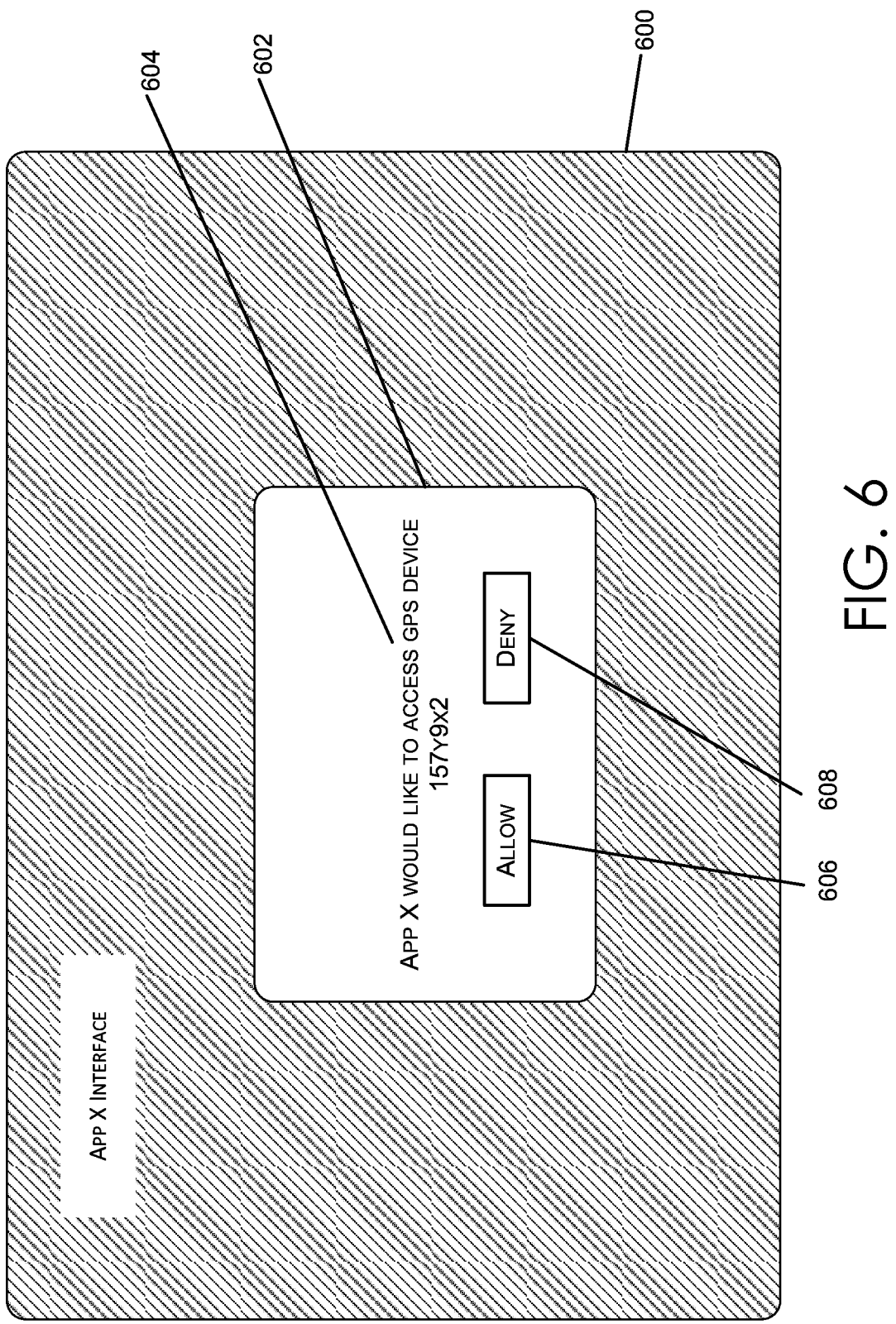
FIG. 6 is a schematic diagram showing an exemplary application interface for obtaining user consent to an application request for access to a peripheral device, in accordance with an embodiment of the present invention.

The schematic diagram of FIG. 6 illustrates an exemplary application interface 600 that may be presented by the user interface presenting sub-component 238 for obtaining user consent to an application request for access to a peripheral device. The application interface 600 represents any application that may be running within a user interface of the computing system (in this case, the application "App X"). Upon receipt of a request from the application to access a particular device (in this case, the device "157Y9X2"), the user interface presenting sub-component 238 of the consent management component 226 causes display of a consent user interface element 602. The consent user interface element 602 includes a description 604 of the peripheral device to which the application is requesting access, the description 604 including the device-specific identifier ("157Y9X2") associated with the peripheral device, as well as a selectable option (the "allow" button 606) to consent to the request. (Note the application interface may similarly be applied to device model identifiers as well.) The peripheral device identified by the device specific identifier ("157Y9X2") may be any peripheral hardware device including, without limitation, a storage device, a camera, a microphone, a printer, a location service device (GPS), a video capture device, a messaging device, or the like.

Returning to FIG. 2, the consent receiving sub-component 240 of the consent management component 226 is configured to receive user input (generally via the user interface element described above) permitting or denying access by a requesting application to a peripheral device and/or device model. In the example shown in FIG. 6, a user may select the "allow" button 606 or "deny" button 608 to either consent to or deny the request, such user selection being received by the consent receiving sub-component 240. Because the consent user interface element 602 of FIG. 6 is displayed upon receipt of the request from the application to access the peripheral device/model, and in context of user interaction with the application, the user is better able to determine when and why the application will use the peripheral device/model.

In addition to runtime consent, a user of the user computing device 210 may have consented to access to a particular peripheral device and/or model thereof by a requesting application via a previous request. As such, the previous consent determining sub-component 242 is configured to determine if user consent for a requesting application to access the peripheral device and/or device model was received prior to the present runtime request. If such prior consent has been given by the user, a grant of access to the peripheral device/model may be automatic without further notification, or may be messaged to the user as a simple reminder that a previous consent has been given while still requiring user confirmation of consent during the present runtime instance. Any and all such variations, and any combination thereof, are contemplated to be within the scope of embodiments of the present invention. Similarly, the previous consent determining sub-component 242 may be configured to determine that a previous request has been received from the requesting application to access the particular peripheral device and that such request was denied by the user. In embodiments, such previous denial may be messaged to the user in the user interface element requesting user consent to the present runtime request.

Figure 7:
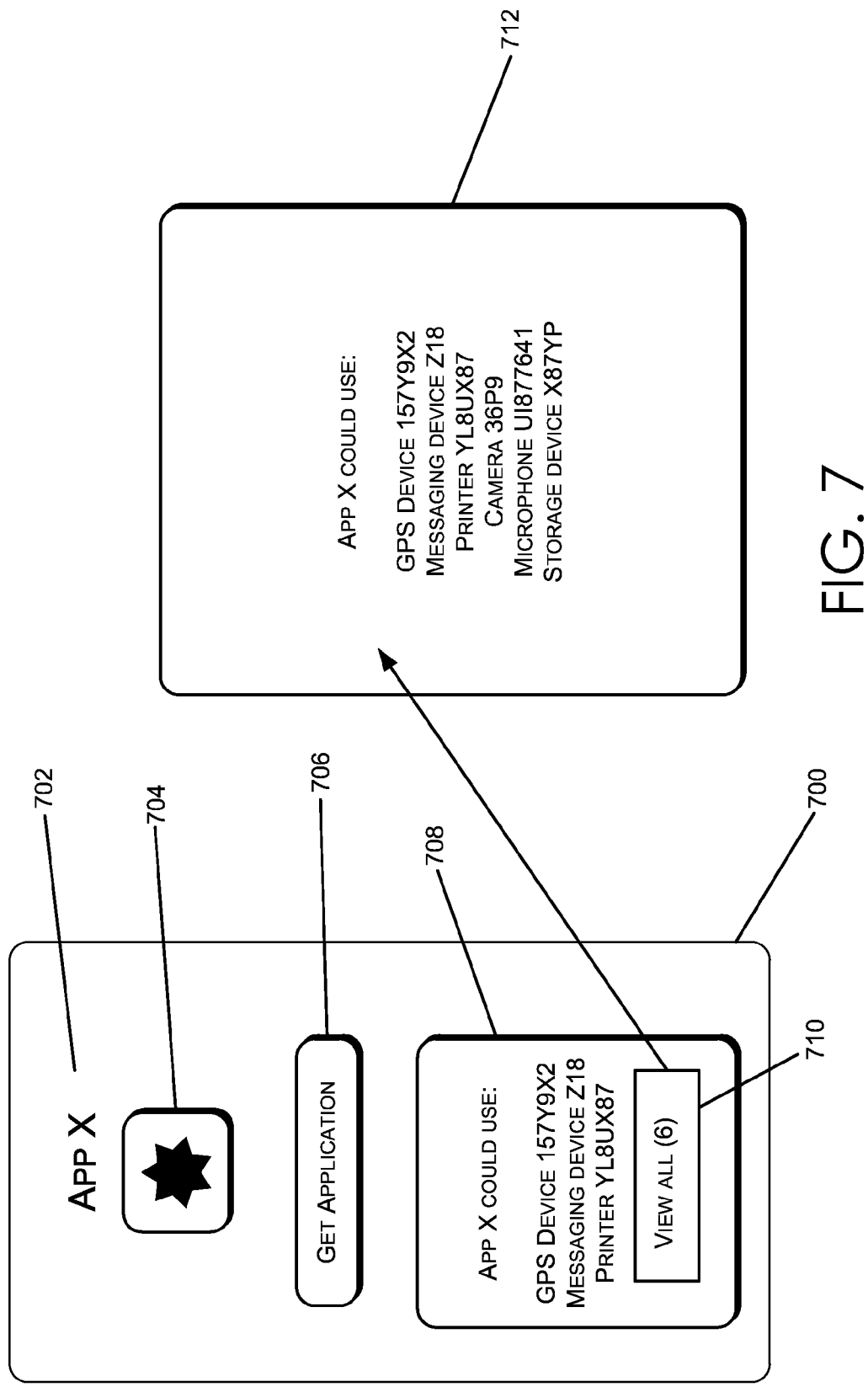
FIG. 7 is a schematic diagram showing an exemplary application acquisition user interface display, in accordance with an embodiment of the present invention.

Prior user consent to access an application may be provided, for instance, upon application acquisition. With reference to FIG. 7, an exemplary application acquisition user interface display 700 is shown including a display of devices. User interface display 700 is displayed by an application acquisition service that is enabled to provide a user with the option to obtain, download, and/or install an application. The user interface display 700 includes one or more features such as an application name 702 (in this case "App X"), an application icon graphic 704, and a selectable option 706 to download or purchase the application. The user interface display 700 also includes a device list 708 that displays one or more devices that the application is enabled to access, each device identified by its appropriate device model identifier and/or device-specific identifier. In embodiments, the device list 708 may include only those devices available in the user's computing system. In other embodiments, the device list 708 may include all devices for which the application (e.g., "App X") is enabled. Any and all such variations, and any combination thereof, are contemplated to be within the scope of embodiments of the present invention. The device list 708 may include only a subset of devices. Therefore, the device list 708 includes a selectable option 710 to view a list 712 of all application-enabled devices.

The user interface display 700 allows a user to better determine what devices/models an application is enabled to perform prior to the user purchasing, downloading, installing, and/or executing the application. The list 712 of all devices/models pulls the list 712 from the application's manifest (not shown), and the user interface display 700 pulls the list from the application's manifest. At some later time, after the user has obtained and execute the application, the application may request access to a device and/or device model. This request is received by an access broker (e.g., the access broker 212 of FIG. 2). As is described elsewhere within this Detailed Description, the access broker may not allow the application to access the device and/or device model unless the device/model is declared in the application manifest.

Presenting the device declarations from the application manifest at the time that the application is obtained, and enforcing a policy that requires the application to declare a device/model in its manifest in order for the application to gain access to that device/model, maintains continuity between those devices that are disclosed to the user and those devices that the application is allowed to use. This way, the application cannot hide device access from the user.

Figure 8:
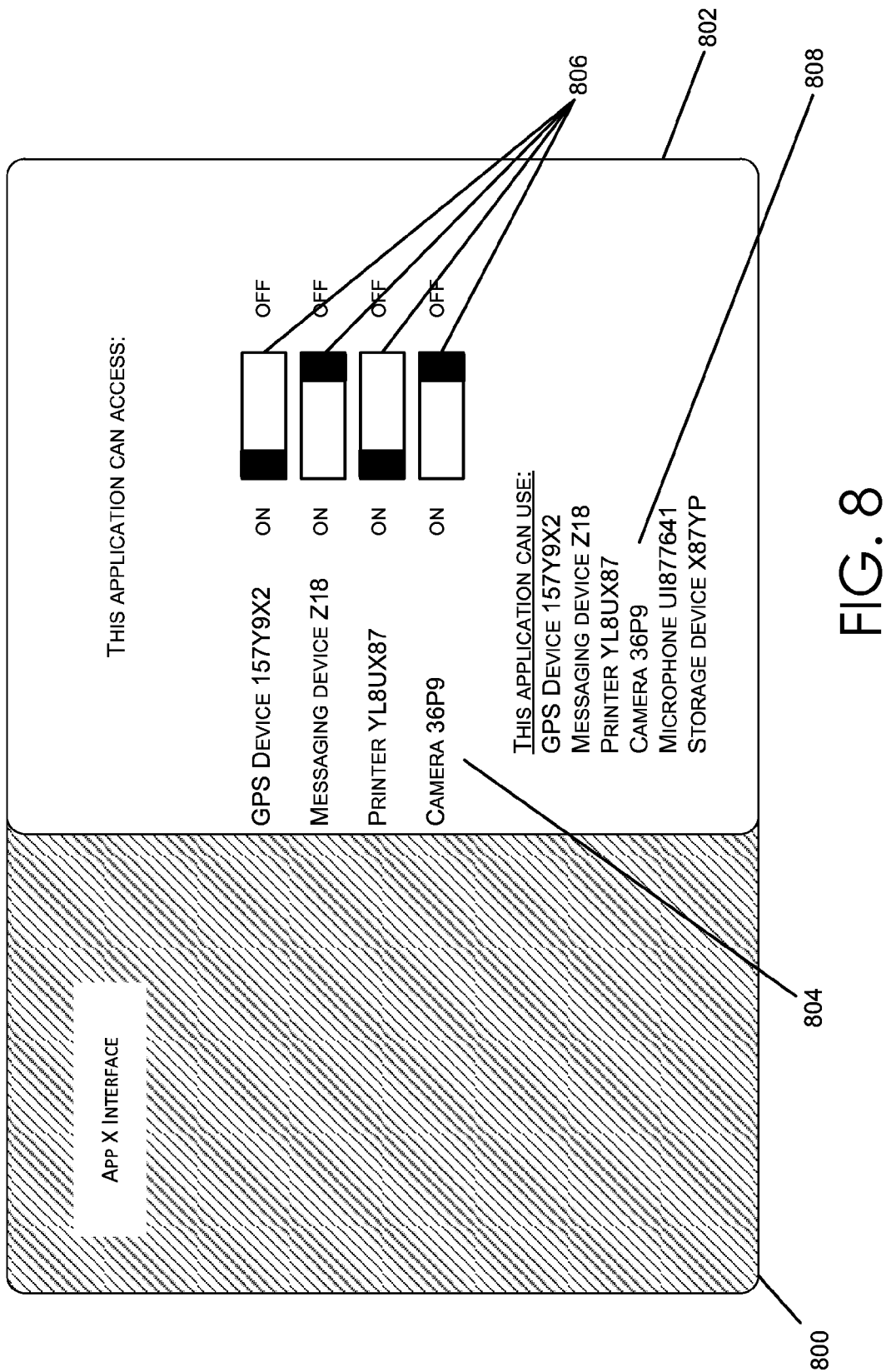
FIG. 8 is a schematic diagram showing an exemplary user interface display for displaying in-application settings information, in accordance with an embodiment of the present invention.

User consent to device and/or device model access may also be provided via an in-application device settings display window. With reference to FIG. 8, an exemplary user interface display for displaying in-application settings information is shown. An application interface 800 is overlaid partially by an in-application device settings display window 802. The in-application device settings display window 802 is an operating system user interface. The in-application device settings display window 802 lists the devices 804 available in association with the subject computing system along with selectable controls 806 to enable or disable access to the devices 804. In the illustrated embodiment, the in-application settings display window 802 also displays a list 808 of devices the application is configured to use or access, the list 808 being taken from an application manifest.

The in-application device settings display window 802 allows the user to view all devices that the application is configured to access in a single location. This way, the user does not need to open multiple configuration settings windows to view this information. Also, because the in-application device settings display window 802 can be accessed during interaction with the application, the user can more easily control the application's access to associated devices. Once an application's settings are changed via the in-application device settings display window 802, an access broker (e.g., the access broker 212 of FIG. 2) is updated to reflect the current state of the application's access to that device.

Figure 9:
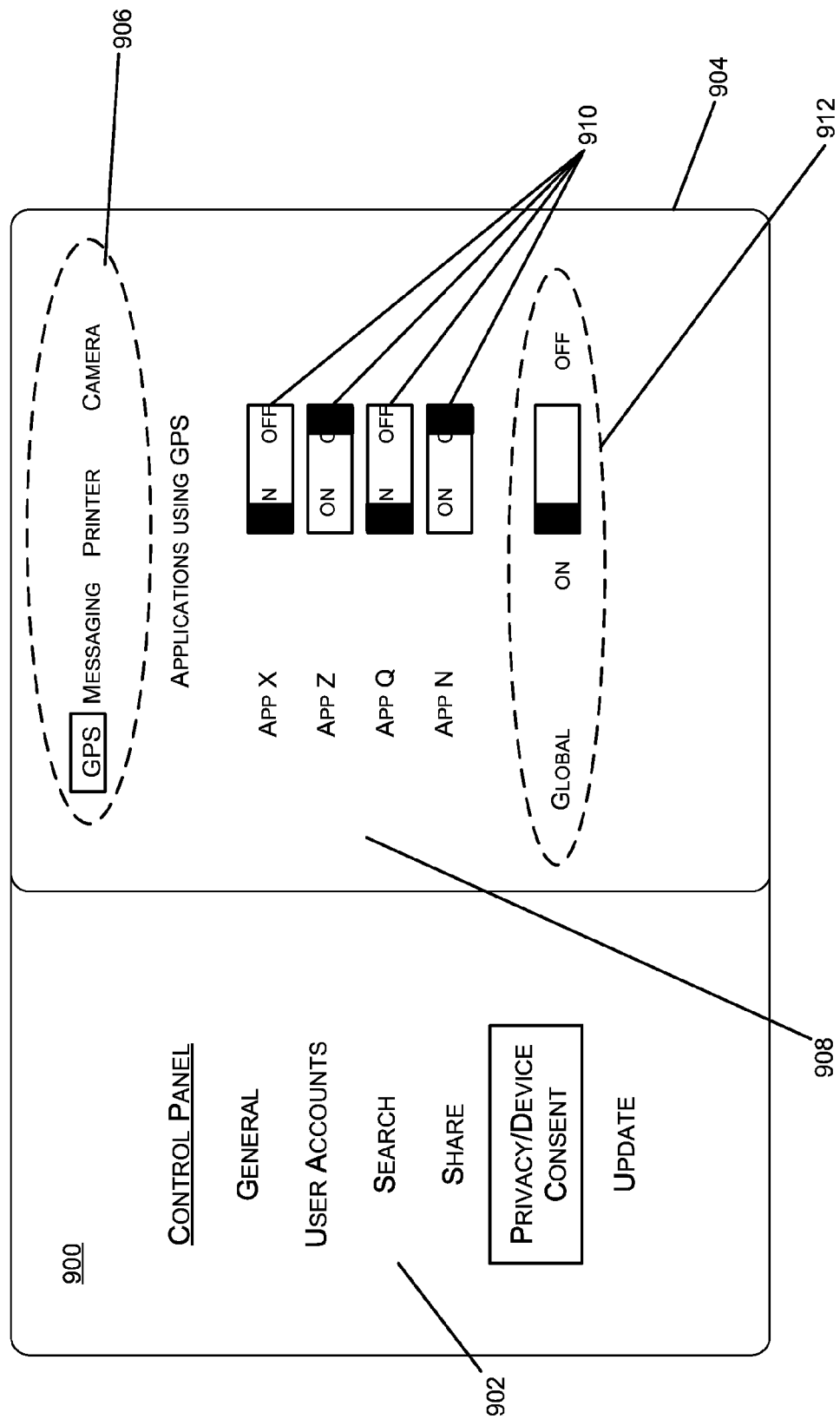
FIG. 9 is a schematic diagram showing an exemplary user interface display for presenting device model and/or device-specific settings information, in accordance with an embodiment of the present invention.

User consent to device and/or device model access may also be provided via a device model and/or device-specific settings display window. With reference to FIG. 9, an exemplary user interface display for presenting device-specific settings information is provided. (Note the user interface is equally applicable to device model settings.) An operating system settings display 900 includes a selectable list 902 of various settings that can be viewed, such as in the "privacy/device consent" settings window 904. The "privacy/device consent" settings window 904 includes a selectable list 906 of devices (shown in dashed circle). In the example shown in FIG. 9, the "GPS" device is currently selected thereby causing a list 908 of all applications that are configured to access the "GPS" device associated with the subject computing system to be shown. Should the "printer" device be selected, for example, a different list would be presented showing all applications configured to access the printer associated with the subject computing system (which may or may not include the same applications as list 908).

The applications in list 908 are presented next to a selectable control 910 for disabling or enabling a particular application's access to the device. The "privacy/device consent" settings window 904 may also include a global option 912 (shown in dashed circle) that is selectable to enable or disable the selected device for all applications. The "privacy/device consent" settings window 904 may therefore allow a user to control access to a particular device for a particular application or, alternatively, turn on or off that device for all applications. Once an application's settings are changed via the operating system settings display 900, an access broker (e.g., the access broker 212 of FIG. 2) is updated to reflect the current state of the application's access to that device.

FIGS. 6-9 illustrate various user interfaces. These user interfaces are presented for the sake of illustration, and their exact layouts and contents are not to be taken as limitations. Alternative layouts and contents can be used without departing from the scope of this Detailed Description.

With returned reference to FIG. 2, at times, a user may change his or her mind during use of an application for that application's use of a particular peripheral device or device model. In such instances, the consent change receiving sub-component 244 of the consent management component 226 is configured to receive runtime changes to user consent for access of a particular application to a particular peripheral device and/or device model. Such changes may be made, for instance, via any of the user interfaces shown in FIGS. 7-9. If the application developer has registered for runtime consent change notifications (e.g., utilizing the access change notifying sub-component 236 of the application developer component 224), upon receipt of a consent change by the consent change receiving sub-component 244, the application is notified of the change so that it may make any desired runtime changes, accordingly, as more fully described below.

In accordance with embodiments of the present invention, firmware updates for particular peripheral devices/models are permitted by an application upon consent of the user. Such user consent aids in protecting the battery life of the computing system running the access broker 212 and ensures that the peripheral device 218 is in a proper state (e.g., plugged in, not unplugged during the firmware update) before a firmware update is performed. Accordingly, the firmware update consent sub-component 246 of the consent management component 226 of the access broker 212 is configured to receive, from applications, requests for firmware updates to particular peripheral devices of the user computing device 210, and to request consent from the user for such firmware updates (e.g., via a user interface (not shown) presented on the display 216 of the user computing device 210). Upon receipt of user consent, firmware updates may be initiated. In this regard, the firmware update component 232 is configured to permit initiation of appropriate firmware updates by applications to peripheral devices/models associated with the user computing device 210 upon receipt of appropriate consent. In embodiments, the access broker 212 may include a policy having a foreground restriction requiring an application to initiate a firmware update in the foreground where a user's consent can be gathered. In addition, the access broker 212 may include a policy limiting the amount of time a particular firmware update may be performed, for instance, to protect the battery life of the computing system running the access broker 212. Any and all such variations, and any combination thereof, are contemplated to be within the scope of embodiments of the present invention.

In embodiments, the firmware update consent sub-component 246 is additionally configured to ensure that an application requesting to perform a firmware update is "privileged" by the device manufacturer. This is accomplished using peripheral device metadata which may be, for instance, an XML file submitted by the device manufacturer. This is similar in concept to the application manifest where the application manifest is submitted by the application developer. In the device metadata XML, the device manufacturer can specify applications that have privilege to the device. In the instant case, the firmware update consent sub-component 246 is configured to validate that an application attempting to perform a firmware update is one of the privileged applications defined in the device metadata XML. If it is not, the firmware update will be blocked. This functionality provides device manufacturers some control over firmware updates.

With continued reference to FIG. 2, the accessing component 228 is configured to allow applications having received the appropriate device model and/or device-specific user consent, and having made the appropriate device model and/or device-specific declarations, where appropriate, to access the associated peripheral device or device model.

Turning now to FIG. 3, a flow diagram is illustrated showing an exemplary method 300 for brokering application access to peripheral devices of a computing system, in accordance with an embodiment of the present invention. As indicated at block 310, a request to access a peripheral device or device model associated with the computing system is received from an application, e.g., received by the request receiving component 222 of the access broker 212 of FIG. 2, the peripheral device and/or model having a device capability desired by the application. The peripheral device includes at least one of a device model identifier and a device-specific identifier associated therewith. As indicated at block 312, it is determined that consent has been received for the application to access the peripheral device/model (e.g., utilizing the consent receiving sub-component 240 and/or the previous consent determining sub-component 242 of the consent management component 226 of FIG. 2). The received consent, in the present runtime instance or prior-received, is based upon the device model identifier and/or the device-specific identifier associated with the peripheral device/model. As indicated at block 314, upon determining that user consent to access the particular peripheral device/model has been received, the application is permitted access the peripheral device or device model (e.g., utilizing the accessing component 228 of the access broker 212 of FIG. 2), providing access by the application to the desired device/model.

With reference now to FIG. 4, a flow diagram is illustrated showing another exemplary method 400 for brokering application access to peripheral devices, in accordance with an embodiment of the present invention. As indicated at block 410, a request to access a peripheral device or device model associated with the computing system is received from an application, e.g., received by the request receiving component 222 of the access broker 212 of FIG. 2, the peripheral device and/or device model having a device capability desired by the application. The peripheral device includes at least one of a device model identifier and a device-specific identifier associated therewith. As indicated at block 412, it is determined that the requesting application has declared the peripheral device/model based upon the device model identifier and/or the device-specific identifier associated therewith, e.g., utilizing the declaring sub-component 234 of the application developer component 224 of the access broker 212 of FIG. 2. As indicated at block 414, it is determined that consent has been received for the application to access the peripheral device/model (e.g., utilizing the consent receiving sub-component 240 and/or the previous consent determining sub-component 242 of the consent management component 226 of FIG. 2). The received consent, in the present runtime instance or prior-received, is based upon the device model identifier and/or the device-specific identifier associated with the peripheral device/model. As indicated at block 416, upon determining that user consent to access the particular peripheral device or device model has been received, the application is permitted access the peripheral device or device model (e.g., utilizing the accessing component 228 of the access broker 212 of FIG. 2), providing access by the application to the desired device/model.

Figure 5:
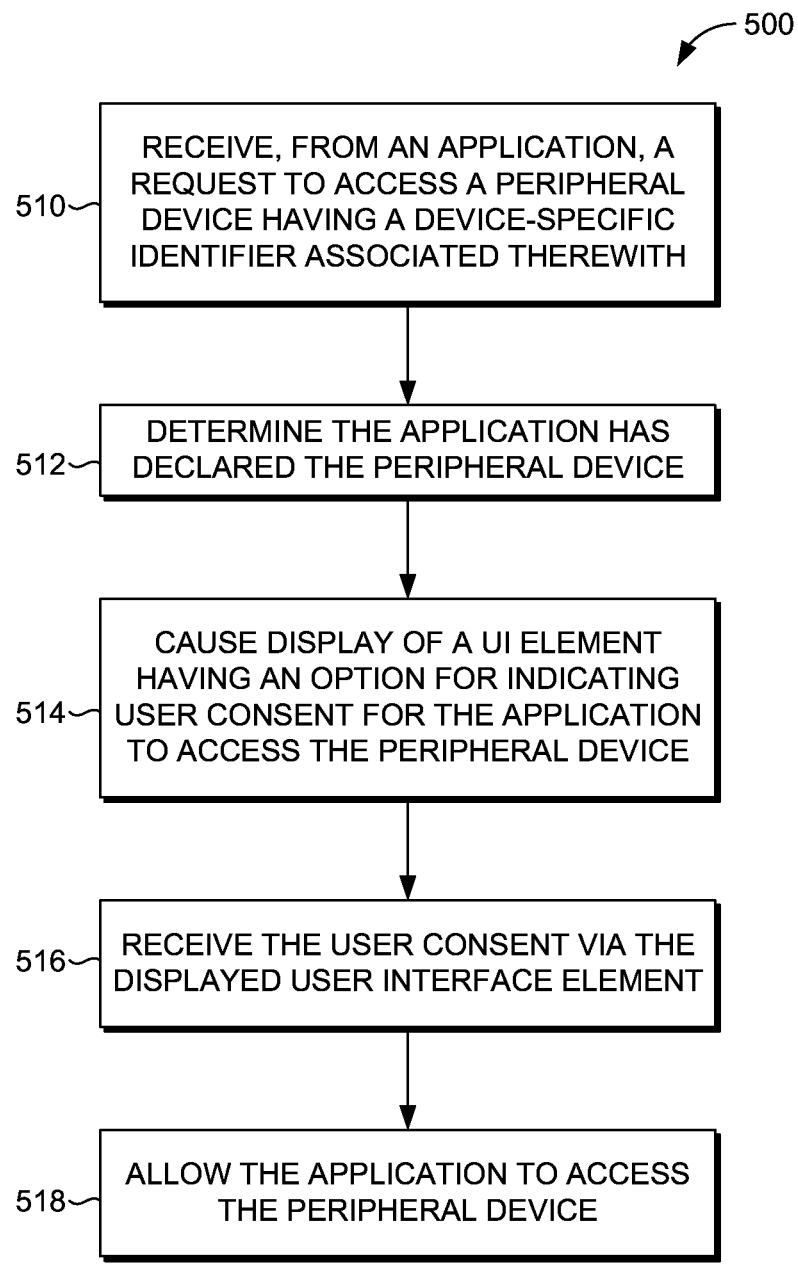
FIG. 5 is a flow diagram showing yet another exemplary method for brokering application access to peripheral devices, in accordance with an embodiment of the present invention.

With reference to FIG. 5, a flow diagram is illustrated showing yet another exemplary method 500 for brokering application access to peripheral devices, in accordance with an embodiment of the present invention. As indicated at block 510, a request to access a peripheral device and/or device model associated with the computing system is received from an application, e.g., received by the request receiving component 222 of the access broker 212 of FIG. 2, the peripheral device/model having a device capability desired by the application. The peripheral device includes at least one of a device model identifier and a device-specific identifier associated therewith. As indicated at block 512, it is determined that the requesting application has declared the peripheral device/model based upon the device model identifier and/or the device-specific identifier associated therewith, e.g., utilizing the declaring sub-component 234 of the application developer component 224 of the access broker 212 of FIG. 2. As indicated at block 514, a user interface element is caused to be displayed (e.g., utilizing the UI presenting sub-component 238 of the consent management component 226 of the access broker 212 of FIG. 2), the user interface element having an option for indicating user consent for the application to access the peripheral device/model. The displayed user interface element includes the device model identifier and/or the device-specific identifier. As indicated at block 516, user consent for the application to access the peripheral device or device model is received via the displayed user interface element (e.g., utilizing the consent receiving sub-component 240 of the consent management component 226 of FIG. 2). The received consent is based upon the device model identifier and/or the device-specific identifier associated with the peripheral device/model. As indicated at block 518, based at least in part upon determining that the appropriate declaration has been made by the application and that the appropriate user consent to access the particular peripheral device/model has been received, the application is permitted access the peripheral device or device model (e.g., utilizing the accessing component 228 of the access broker 212 of FIG. 2), providing access by the application to the desired device/model.

As can be understood, embodiments of the present invention provide systems, methods, and computer-readable storage media for, among other things, brokering access to peripheral devices associated with a computing system. An access broker evaluates requests for access to peripheral devices and/or device models on behalf of a plurality of applications. Generally, such requests indicate an application desires to access a particular capability associated with an identified peripheral device or device model. The access broker enforces certain behaviors and policies before granting an application access to a device/model at runtime. The access broker evaluates requests for access to peripheral devices and/or device models including scanners, point-of-sale devices, and devices using ubiquitous device protocols (e.g., USB, HID, Bluetooth, and Bluetooth LE) utilizing application declarations and user consents based upon device model identifiers and/or device-specific identifiers associated with the various devices.

Utilizing embodiments of the present invention applications may be notified of a grant, revocation or other change in consent at runtime providing the application the opportunity to update features thereof (e.g., UI features) accordingly. Further, application firmware updates for peripheral devices may be conducted upon receipt of user consent, for instance, to ensure adequate battery power before performing a peripheral device firmware update.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3, 400 of FIG. 4, and 500 of FIG. 5 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to broker application access to peripheral devices of a computing system, the computer-useable instructions causing the one or more computing devices to:
   notify an application of changes to user access consent for application access to a peripheral device associated with the computing system, a peripheral device being an external sensor that utilizes a ubiquitous device protocol;
   receive, from the application, a request to access the peripheral device, the peripheral device having at least one of a device model identifier and a device-specific identifier associated therewith;
   determine that the application has declared the peripheral device in an application manifest associated therewith, the determining being based upon the at least one of the device model identifier and the device-specific identifier associated with the peripheral device;
   determine that consent has been received for the application to access the peripheral device; and
   allow the application to access the peripheral device.

2. The one or more computer-readable storage media of claim 1, wherein the determining that the application has declared the peripheral device is performed prior to allowing the application to access the peripheral device.

3. The one or more computer-readable storage media of claim 1, wherein determining that consent has been received for the application to access the peripheral device comprises:
   causing display of a user interface element having an option for indicating user consent for the application to access the peripheral device; and
   receiving the user consent via the displayed user interface element.

4. The one or more computer-readable media of claim 1, wherein determining that consent has been received for the application to access the peripheral device comprises determining that user consent to a previous request by the application for access to the peripheral device was received prior to receipt of the request.

5. The one or more computer-readable storage media of claim 1, wherein the ubiquitous device protocol is one of Universal Serial Bus (USB), Human Interface Device (HID), Bluetooth, and Bluetooth Low Energy (LE).

6. The one or more computer-readable storage media of claim 1, wherein the computer-useable instructions further cause the one or more computing devices to:
   receive an indication to change the access afforded the application to the peripheral device;
   determine the application is registered for access change notifications; and
   notify the application of the access change.

7. The one or more computer-readable storage media of claim 1, wherein the computer-useable instructions further cause the one or more computing devices to:
   receive an indication, from the application, of a firmware update for the peripheral device;
   determine that the application is a privileged application;
   receive consent for the firmware update; and
   allow the firmware update based, at least in part, on the determination that the application is a privileged application and on the received consent.

8. A computing system comprising:
an access broker executable by one or more processors; and
a peripheral device having at least one of a device model identifier and a device-specific identifier associated therewith;
the access broker causing the computing system to:
notify an application of changes to user access consent for access to a peripheral device, a peripheral device being an external sensor that utilizes a ubiquitous device protocol;
receive, from the application, a request to access the peripheral device;
determine that the requesting application has declared the peripheral device based upon the device model identifier and/or the device-specific identifier associated therewith;
determine that consent has been received for the application to access the peripheral device; and
allow the application to access the peripheral device.

9. The system of claim 8, wherein the access broker determines that consent has been received for the application to access the peripheral device by causing display of a user interface element having an option for indicating user consent for the application to access the peripheral device, the displayed user interface element including the device model identifier and/or the device-specific identifier; and receiving the user consent via the displayed user interface element.

10. The system of claim 8, wherein the access broker determines that consent has been received for the application to access the peripheral device by determining that user consent to a previous request by the application for access to the peripheral device was received prior to receipt of the request.

11. The system of claim 8, wherein the ubiquitous device protocol is one of Universal Serial Bus (USB), Human Interactive Device (HID), Bluetooth and Bluetooth Low Energy (LE).

12. The system of claim 8, wherein the access broker further causes the computing system to:
receive an indication to change the access afforded the application to the peripheral device;
determine the application is registered for access change notifications; and
notify the application of the access change.

13. The system of claim 8, wherein the access broker further causes the computing system to:
receive an indication, from the application, of a firmware update for the peripheral device;
determine that the application is a privileged application;
receive consent for the firmware update; and
allow the firmware update based, at least in part, on the determination that the application is a privileged application and on the received consent.

14. A method being performed by one or more computing devices including at least one processor, the method for brokering application access to peripheral devices associated with a computing system for a plurality of applications, the method comprising:
notifying the plurality of applications of changes to user access consent for access to a peripheral device associated with the computing system, a peripheral device being an external sensor that utilizes a ubiquitous device protocol;
receiving, from a first application and a second application, a request to access a peripheral device associated with the computing system, the peripheral device having at least one of a device model identifier and a device-specific identifier associated therewith;
determining that the first application and second application have declared the peripheral device based upon the device model identifier and/or the device-specific identifier associated therewith;
causing display of a user interface element having an option for indicating user consent for the first application and second application to access the peripheral device, the displayed user interface element including the device model identifier and/or the device-specific identifier;
receiving the user consent for the first application via the displayed user interface element; and
allowing the first application to access the peripheral device based, at least in part, on the peripheral device declaration of the application and the received user consent, the first application being granted access to the peripheral device and a second application not being granted access to the peripheral device.

15. The method of claim 14, further comprising:
receiving an indication to revoke the access afforded the second application to the peripheral device;
determining the second application is registered for access change notifications; and
notifying the second application of the access revocation.

16. The method of claim 14, further comprising:
receiving an indication, from the first application, of a firmware update for the peripheral device;
determining that the first application is a privileged application;
receiving consent for the firmware update; and
allowing the firmware update based, at least in part, on the determination that the first application is a privileged application and on the received consent.

17. The method of claim 14, wherein the ubiquitous device protocol is one of Universal Serial Bus (USB), Human Interface Device (HID), Bluetooth and Bluetooth Low Energy (LE).

18. The one or more computer-readable storage media of claim 1, wherein the sensor is one of a camera, a microphone, a location service device (GPS), or a video capture device.

19. The one or more computer-readable storage media of claim 1, wherein the computer-useable instructions further cause the one or more computing devices to:
receive device model and device-specific peripheral device declarations; and
determine whether an application requesting access to a particular peripheral device has appropriately declared such peripheral device based upon the device model and device-specific peripheral device declarations.

20. The one or more computer-readable storage media of claim 1, wherein the computer-useable instructions further cause the one or more computing devices to:
enforce a policy that requires the application to declare the peripheral device in the application manifest in order for the application to gain access to the peripheral device.

* * * * *